US011960658B2

(12) United States Patent
Planek et al.

(10) Patent No.: US 11,960,658 B2
(45) Date of Patent: Apr. 16, 2024

(54) METHOD AND APPARATUS FOR BYPASS BLOCK WEBPAGE NAVIGATION

(71) Applicant: Salesforce, Inc., San Francisco, CA (US)

(72) Inventors: Robert Planek, Chicago, IL (US); Zachary Hawtof, San Francisco, CA (US); Donielle Berg, San Francisco, CA (US); Stephen Cook, San Francisco, CA (US); Terrance Li, Bellevue, WA (US)

(73) Assignee: Salesforce, Inc.

( * ) Notice: Subject to any disclaimer, the term of this patent is extended or adjusted under 35 U.S.C. 154(b) by 0 days.

(21) Appl. No.: 17/247,917

(22) Filed: Dec. 30, 2020

(65) Prior Publication Data
US 2022/0206590 A1 Jun. 30, 2022

(51) Int. Cl.
G06F 3/023 (2006.01)
G06F 9/451 (2018.01)
G06F 16/954 (2019.01)
H04L 67/02 (2022.01)
H04L 67/75 (2022.01)

(52) U.S. Cl.
CPC ............ *G06F 3/0238* (2013.01); *G06F 9/451* (2018.02); *G06F 16/954* (2019.01); *H04L 67/02* (2013.01); *H04L 67/75* (2022.05)

(58) Field of Classification Search
CPC ...... G06F 3/0238; G06F 9/451; G06F 16/965; G06F 16/954; H04L 67/02; H04L 67/36
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |

(Continued)

*Primary Examiner* — Matthew A Eason
*Assistant Examiner* — Scott D Au
(74) *Attorney, Agent, or Firm* — Lorenz & Kopf, LLP

(57) ABSTRACT

A method and apparatus for performing a bypass block navigational function to a user interface including generating, by a processor, a webpage including a bypass block navigation attribute associated with a first portion of the webpage, receiving, at a network interface a request for the webpage from the user interface, transmitting, by the network interface, the webpage and a software module including an instruction associated with the bypass block navigation function in response to the request, causing display, at the user interface, the webpage at a starting location, receiving, from the user interface, a keystroke associated with the bypass block navigation function, and causing display, at the user interface, of the first portion of the webpage in response to the instruction associated with the bypass block navigation function.

20 Claims, 5 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2006/0069617 A1* | 3/2006 | Milener ............... G06Q 20/145 705/14.69 |
| 2008/0244420 A1* | 10/2008 | Dube .................... G06F 16/954 715/760 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0058239 A1* | 3/2010 | Cooke .................. G06F 3/04892 715/827 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |

* cited by examiner

100

110

Quia Valde Parva Sint, Nos Quoque Concedimus quia valde parva sint, nos quoque concedimus Lorem ipsum dolor sit amet, consectetur adipiscing elit. Atque his de rebus et splendida est eorum et illustris oratio. Nam de isto magna dissensio est. Quodsi vultum tibi, si incessum fingeres, quo gravior viderere, non esses tui similis; Duo Reges: constructio interrete.

120

Ait enim se, si uratur, Quam hoc suave! dicturum. Duarum enim vitarum nobis erunt instituta capienda. Rapior illuc, revocat autem Antiochus, nec est praeterea, quem audiamus. Themistocles quidem, cum ei Simonides an quis alius artem memoriae polliceretur, Oblivionis, inquit, mallem. Non minor, inquit, voluptas percipitur ex vilissimis rebus quam ex pretiosissimis. Itaque eos id agere, ut a se dolores, morbos, debilitates repellant. *Nemo igitur esse beatus potest.* Ita prorsus, inquam, Progredientibus autem aetatibus sensim tardeve potius quasi nosmet ipsos cognoscimus. *Atqui reperies, inquit, in hoc quidem pertinacem.*

Ut id aliis narrare gestiant? *Maximus dolor, inquit, brevis est.* Quod ea non occurrentia fingunt, vincunt Aristonem; *Quae sequuntur igitur?* Erat enim res aperta. Te enim iudicem aequum puto, modo quae dicat ille bene noris. At modo dixeras nihil in istis rebus esse, quod interesset. Ita nemo beato beatior. Nihil opus est exemplis hoc facere longius. Honesta oratio, Socratica, Platonis etiam.

Dicit Obscurari Quaedam Nec Apparere

Lorem ipsum dolor sit amet, consectetur adipiscing elit. Ut aliquid scire se gaudeant? Deque his rebus satis multa in nostris de re publica libris sunt dicta a Laelio. Indicant pueri, in quibus ut in speculis natura cernitur. *Quid dubitas igitur mutare principia naturae?* Quae cum dixisset, finem ille. *Neutrum vero, inquit ille.* Facillimum id quidem est, inquam. Dicet pro me ipsa virtus nec dubitabit isti vestro beato M.
Negat esse eam, inquit, propter se expetendam. Aliter enim explicari, quod quaeritur, non potest. Portenta haec esse dicit, neque ea ratione ullo modo posse vivi;
Duo Reges: constructio interrete. Itaque mihi non satis videmini considerare quod iter sit naturae quaeque progressio. Laelius clamores sofòw ille so lebat Edere compellans gumias ex ordine nostros. Nec tamen ullo modo summum pecudis bonum et hominis idem mihi videri potest. Qui autem esse poteris, nisi te amor ipse ceperit? Cur ipse Pythagoras et Aegyptum lustravit et Persarum magos adiit?

FIG. 1

METHOD AND APPARATUS FOR BYPASS BLOCK WEBPAGE NAVIGATION

TECHNICAL FIELD

Embodiments of the subject matter described herein relate generally to user interface design and configuration. More particularly, embodiments of the subject matter relate to providing a bypass block mechanism for webpage navigation in a user interface.

BACKGROUND

Improving expedient website and webpage navigation for users has become a concern for website administrators and developers. Often intra-page links are provided on webpages, such as a "jump to bottom" link or links to footnotes, so that a user may click the link using a mouse and jump right to the section of interest. A user may also use the arrow keys on a keyboard to scroll up or down a webpage or may use the Tab key on the keyboard to jump to the next active link on the webpage.

People with certain disabilities rely on using their keyboard to interact with a web page. Most web browsers support traversing web pages via the Tab key, which allows keyboard navigators to move through and interact with different elements of the page. A problem arises when a page is full of many interactive elements. It becomes tedious for a keyboard navigator to Tab through multiple elements that they are not interested in interacting with. Accordingly, it is desirable to overcome these problems and provide an improved method and apparatus for providing a bypass block mechanism for webpage navigation in a user interface. Furthermore, other desirable features and characteristics will become apparent from the subsequent detailed description and the appended claims, taken in conjunction with the accompanying drawings and the foregoing technical field and background.

SUMMARY

Disclosed herein are provision, control, and automation methods and systems and related control logic for configuring and provisioning user interfaces and for executing a mechanism for a keyboard user to bypass blocks of webpage information during webpage navigation. By way of example, and not limitation, there is presented various embodiments of bypass block mechanism for webpage navigation in a user interface are disclosed herein.

In accordance with an aspect of the present disclosure, a method of providing a bypass block navigational function to a user interface including generating, by a processor, a webpage including a bypass block navigation attribute associated with a first portion of the webpage, receiving, at a network interface a request for the webpage from the user interface, transmitting, by the network interface, the webpage and a software module including an instruction associated with the bypass block navigation function in response to the request, causing display, at the user interface, the webpage at a starting location, receiving, from the user interface, a keystroke associated with the bypass block navigation function, and causing display, at the user interface, of the first portion of the webpage in response to the instruction associated with the bypass block navigation function.

In accordance with another aspect of the present disclosure an apparatus for providing a user interface including a processor configured for generating a webpage including a bypass block navigation attribute associated with a first portion of the webpage, a network interface configured for receiving a request for the webpage from the user interface, and transmitting the webpage and a software module including an instruction associated with the bypass block navigation function in response to the request, and the user interface configured for causing display of the webpage at a starting location, for receiving a keystroke associated with the bypass block navigation function and causing display of the first portion of the webpage in response to the instruction associated with the bypass block navigation function.

In accordance with another aspect of the present disclosure, a web server for providing a bypass block navigational function including a processor for generating a webpage including a bypass block navigation attribute and a software module including instructions for performing a bypass block navigation function, and a user interface for causing display, at the user display, the webpage at a starting location, for receiving, from a user input, a keystroke associated with the bypass block navigation function, and for causing display, at the user display a first portion of the webpage identified by the bypass block navigation attribute in response to the instructions for performing the bypass block navigation function.

The above advantage and other advantages and features of the present disclosure will be apparent from the following detailed description of the preferred embodiments when taken in connection with the accompanying drawings.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 1 shows an exemplary webpage for implementation and utilization of bypass block webpage navigation according to an exemplary embodiment of the present disclosure.

Figure 2:
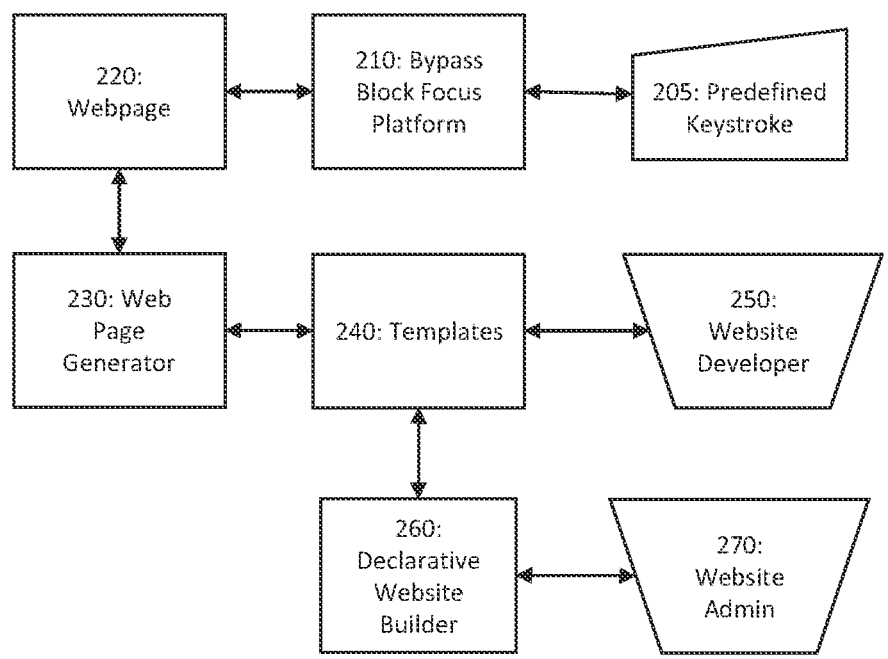
FIG. 2 is a block diagram of an exemplary system for bypass block webpage navigation according to an exemplary embodiment of the present disclosure.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The Web Content Accessibility Guidelines (WCAG) standards for navigable sites define the concept of Bypass Blocks in WCAG 2.1 Section 2.4.1. These are blocks of content on a web page that an end user can skip over when navigating on the web page with a keyboard. In order to adhere to the WCAG standard, individual website administrators and developers must provide specific functionality to define bypass blocks for their web pages. With the currently disclosed bypass Block focus platform, website administrators and developers to declaratively and programmatically distinguish which regions and components of their website pages are bypass blocks.

Turning now to FIG. 1, an exemplary webpage 100 for implementation and utilization of bypass block webpage navigation according to an exemplary embodiment of the present disclosure is shown. The exemplary webpage 100 illustrates a text intensive document 110 displayed as a webpage with numerous embedded hyperlinks 120, shown in bold, within the text. The hyperlinks 120 provide navigation information to the web browser to other webpages, specific elements or locations in the current webpage, or other images or documents, such a portable document format (pdf) file or a JPEG image file. Typically, pressing the keyboard tab button on a keyboard will cause a web browser to select a next hyperlink 120 on a webpage. People with certain disabilities rely on using their keyboard to interact with a web page. It becomes readily apparent from the exemplary, text intensive, webpage 100 that navigating with the keyboard when the webpage is full of many interactive elements may become tedious and time consuming for a keyboard navigator.

To address this concern, the exemplary method and platform allows website developers or administrators to programmatically or declaratively create web pages that will enable keyboard navigators to bypass blocks of content on the page without the downsides of tab navigation. With the Bypass Block Focus Platform, webpages may be generated using templates built by a developer with code or by an administrator through a declarative builder. In the template or builder, a developer may specify what blocks of the page they want to be accessible with the Bypass Block Focus Platform through a data attribute which defines the Bypass Blocks on the page. For example, the attribute may be a "data-f6-region." The exemplary method and platform may facilitate the building of any webpage on the platform to be customized to suit the accessibility needs required by the page. The resulting webpages allow users to navigate between predefined Bypass Blocks on the page, without needing to interact with the elements in that block using a predefined keypress, such as an F6 or CTRL-F6 keypress. The user may access the block of the page they are interested in with the Bypass Block Focus Platform and then use tab navigation to interact with the element within the selected block, bypassing the need to tab through elements that may precede the selected block.

Turning now to FIG. 2, a functional block diagram 200 of a workflow for bypass block webpage navigation according to an exemplary embodiment of the present disclosure is shown. The exemplary workflow may be performed by a web server, a user interface. In some instances, portions of the workflow may be performed on a user device in response to controls provided by a web server or a user interface.

The exemplary workflow may include declarative instructions provided by a website administrator 270 to a declarative website generator 260. These declarative instructions may include a desired output for the website. In addition, these instructions may include a request to include bypass block navigation points. In a declarative programming environment, the declarative website builder may determine appropriate locations for the attributes used to demark the bypass block locations. Determined location may include a typical page length, a heading, the start of each new paragraph, or the like. The declarative website builder 260 may then modify a webpage template 240 with the instructions generated by the declarative website builder 260 in response to the declarative instructions provided by the website admin 270 and provide this modified template to the webpage generator 230.

In an imperative programming environment, a website developer 250 may provide more explicit instructions to the webpage generator 230 to more specifically define the desired website. This make include specific locations within the webpage where the website developer 250 desires bypass block navigation points. These bypass block navigation points may be defined by an attribute, such as a "data-f6-region." These specific programming instructions, including the bypass block navigation attributes, may be used to modify a template where the modified template is provided to the webpage generator 230.

The webpage generator 230 receives the modified template and/or additional instructions from the website developer 250 or the declarative website builder 260 and generates a webpage 220. In this exemplary embodiment, the webpage 220 would include bypass block navigation points defined by a bypass block attribute, such as a "data-f6-region." In addition, the webpage 220 may include code, such as JavaScript code or a JavaScript module which provides instructions to the browser as to the operation of the bypass block. For example, a JavaScript module, such as a bypass block focus platform 210, may be delivered to the webpage browser along with the html code defining the webpage contents.

In this exemplary embodiment, when the user requests the webpage 220 via a web browser or the like, the webpage and the bypass block function platform 210 code is transmitted to a user interface from the web server. When the user actuates a predefined keystroke 205, such as "Ctrl-F6" or "Cmd-F6," the bypass block function platform 210 code is activated, the next occurrence of the bypass block attribute is located and the browser viewing location is reset to the location of the attribute. Likewise, an alternate keystroke 205 may be detected, such as "shift-Ctl-F6" and the bowser viewing location may be reset at a location of a bypass block navigation points defined by an attribute at a prior webpage location.

Figure 3:
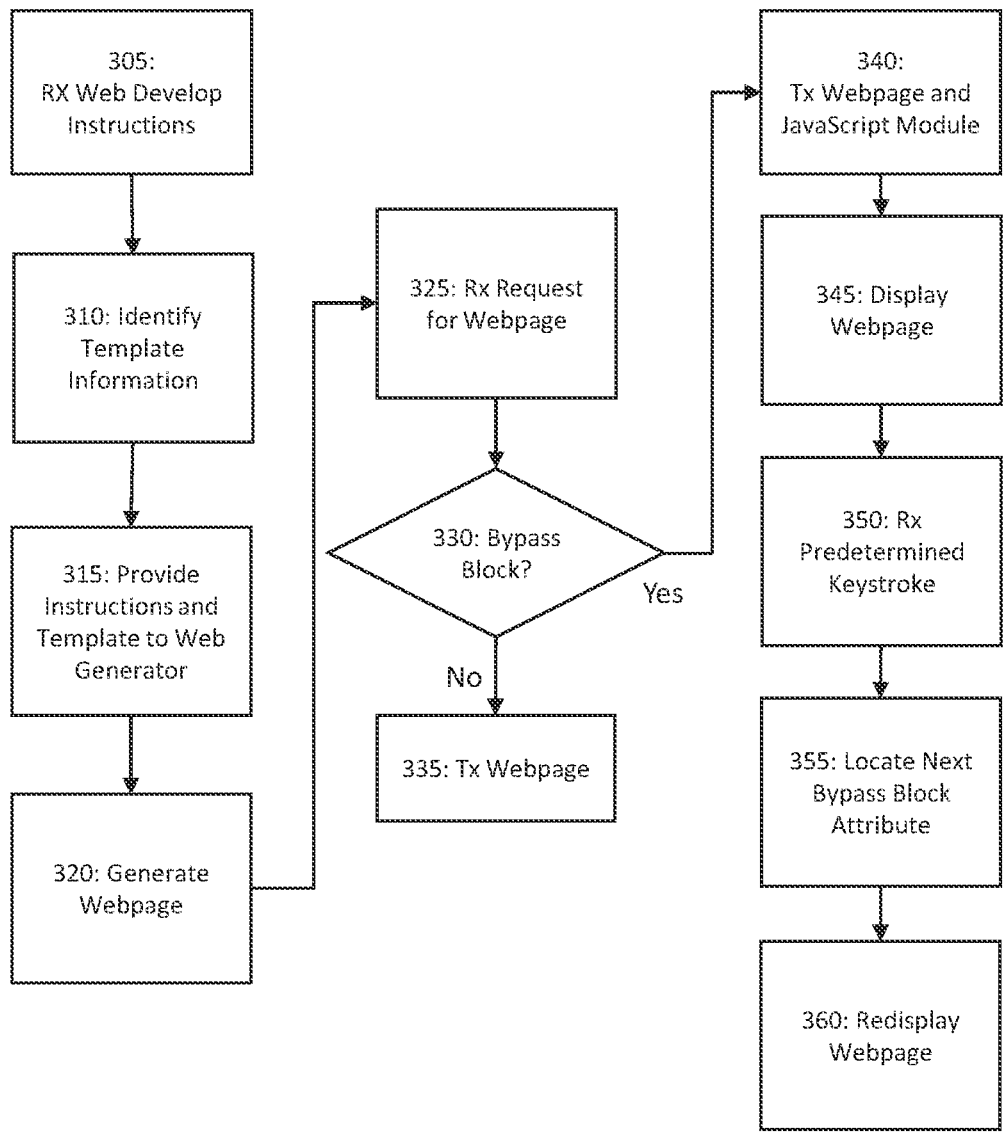
FIG. 3 is a flowchart of a method for bypass block webpage navigation according to an exemplary embodiment of the present disclosure.

Turning now to FIG. 3, a flowchart of a method for bypass block webpage navigation according to an exemplary embodiment of the present disclosure is shown.

The method is first configured to receive 305 an instruction from a web developer. The web developer may be a website administrator providing declarative programming instructions, or a programmer providing imperative programming instructions. The instructions may include location information related to the webpage content indicating a desired location for a bypass block location. The bypass block location may be a location the developer desires a point in the website the developer wishes a browser to display in response to a predetermined key press or key press combination, such as "CTRL-F6".

Once the instructions are provided, website template information may also be indicated 310 with the instructions concerning desired website templates. These templates may be determined by the web developer or may be automatically indicated by the system in the instance that the webpage is part of a larger web platform, such as website with multiple webpages and applications where a consistent look and operation is desired.

The programming instructions and desired template information is then provided 315 to a webpage generator. The webpage generator is then configured to generate 320 a webpage in response to the programming instructions and desired template. In particular, the webpage generator is configured to provide bypass block attributes within the webpage. In a first embodiment, a web programmer has provided explicit locations for the bypass block attributes within an HTML program file. Alternatively, a declarative website builder may indicate locations for bypass block attributes in response to a defined formula or format, such as at each primary heading or before a figure. In this example, a website administrator may indicate that bypass block navigation is desired and the declarative website builder determines the appropriate locations for the bypass block attributes.

The method is next configured to receive 325 a request for the generated webpage from a browser or the like via a network connection. The method the determines 330 if bypass block navigation is included in the webpage. If bypass block navigation is not included in the webpage, the method is configured to transmit 335 the requested webpage data to the browser. If the bypass block navigation is included in the webpage, the method is configured to transmit 340 a JavaScript module including instructions for the bypass block navigation function with the requested webpage to the browser.

The method is then operative to display 345 the requested webpage data at the browser to the user. In the instance of the bypass block navigation function being enabled, the method is then configured to receive 350 a predetermined keystroke in response to a user input, to determine 355 the next location of a bypass block navigation attribute within the webpage, and the redisplay 360 the webpage information positioned according to the bypass block navigation attribute. For example, if the next bypass block navigation attribute is associated with a primary heading within the webpage, the webpage contents may be redisplayed with the primary heading located at the top of the browser display.

Figure 4:
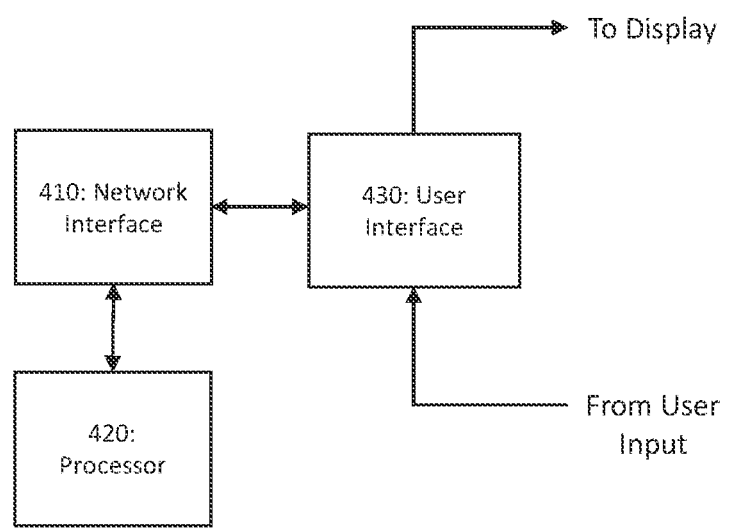
FIG. 4 is block diagram of another exemplary system for bypass block webpage navigation according to an exemplary embodiment of the present disclosure.

Turning now to FIG. 4, a block diagram illustrating a system 400 for bypass block webpage navigation according to an exemplary embodiment of the present disclosure is shown. The exemplary system 400 may include a network interface 410, a processor 420, and a user interface 430.

In this exemplary embodiment, the processor 420 may be configured for generating a webpage including a bypass block navigation attribute associated with a first portion of the webpage. The webpage may be generated in response to imperative programming instructions provided by a programmer or may be generated in response to a desired output provided by a website developer via a declarative programming process. The programming instructions may include specific locations for bypass block navigation attributes. Alternatively, the bypass block navigation attributes may be automatically placed within the webpage, such as at the beginning of each major and/or minor heading or at the beginning of each figure in response to the declarative programming process.

The processor 420 may generate the webpage in response to a template and wherein the template includes a software module to provide instructions related to the bypass block navigation function. Templates may be provided to ensure a consistent look and performance for a website or web application across multiple webpages. The bypass block navigation attribute is a software attribute indicative of a desired location for the bypass block navigation. For example, the bypass block navigation attribute may defined as a "data-f6-region." A user providing a predefined keystroke, such as "a CTRL-F6keypress" may then relocate the browser viewing location at the location of the "data-f6-region" using instructions provided in a bypass block software module.

The processor 420 is then coupled to a network interface 410 configured for receiving a request for the webpage from the user interface 430. The network interface 410 may then transmit the webpage and the bypass block software module including an instruction associated with the bypass block navigation function to the user interface 430 in response to the request. The user interface 430 may be a web server for interacting with a user via a data network, such as the internet. The user interface 430 may be a software module located on a user platform for providing some functionality locally, such as the bypass block navigation function, in response to keystrokes received at a user input attached to the user platform and displaying the webpage on a display attached to the user platform.

In one exemplary embodiment, the user interface 430 may be configured for causing display of the webpage at a starting location. The user interface 430 may then receive a keystroke associated with the bypass block navigation function from a user input. The user interface 430 may then cause display of the first portion of the webpage, on a display, in response to the instruction associated with the bypass block navigation function. In addition, the user interface 430 may receive a second keystroke associated with the bypass block navigation function, and cause display of a second portion of the webpage different from the first portion, wherein the first portion and the second portion are both associated with the bypass block navigation attribute. Thus, a user may be able to navigate through a long webpage using multiple predefined keystrokes which each reset the webpage display to the next bypass block navigation attribute location on the webpage. For example, the user interface 430 may be configured receiving another second instance of the keystroke associated with the bypass block navigation function via the user interface and causing display of a second portion of the webpage different from the first portion, wherein the webpage further includes a second instance of the bypass block navigation attribute at the second portion of the webpage.

The user interface 430 may be further configured for receiving an alternate second keystroke associated with the bypass block navigation function and causing display of a prior portion of the webpage different from the first portion, wherein the webpage further includes a prior instance of the bypass block navigation attribute at the prior portion of the webpage. In one example, the alternate keystroke may include an additional key in a combination keypress, such as such as an "ALT-CTRL-F6" keypress or a "SHIFT-CTRL-F6" keypress.

In one exemplary embodiment, the system 400 for bypass block webpage navigation may include a web server including a processor 420 for generating a webpage including a bypass block navigation attribute and a software module including instructions for performing a bypass block navigation function. The system 400 may further include a user interface 430 for causing display, at the user display, the webpage at a starting location, for receiving, from a user input, a keystroke associated with the bypass block navigation function, and for causing display, at the user display a first portion of the webpage identified by the bypass block navigation attribute in response to the instructions for performing the bypass block navigation function. The user interface 430 may be further configured for receiving a second instance of the keystroke associated with the bypass block navigation function via the user input and causing display of a second portion of the webpage different from the first portion, identified by a second instance of the bypass block navigation attribute at the second portion of the webpage.

Figure 5:
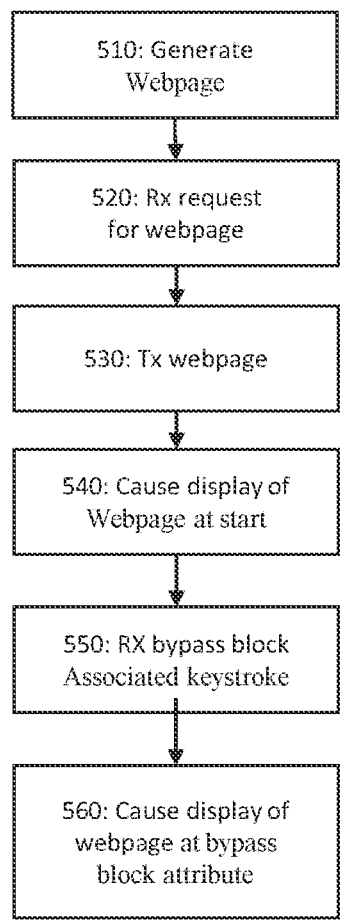
FIG. 5 is a flowchart of another method for bypass block webpage navigation according to an exemplary embodiment of the present disclosure.

Turning now to FIG. 5, a flowchart illustrating a method 500 for bypass block webpage navigation according to an exemplary embodiment of the present disclosure is shown. In this exemplary method 500, a webpage generator is configured to generate a webpage including bypass block navigation attributes for enabling a bypass block navigation process on a user displayed webpage. The bypass block navigation process may be enabled by providing a webpage and associated software modules to a user interface located on a web server, user device or combination thereof.

The method 500 of providing a bypass block navigational function to a user interface is first operative for generating 510, by a processor, a webpage including a bypass block navigation attribute associated with a first portion of the webpage. The webpage may be generated in response to an imperative programming processor or a declarative programming process. The webpage may further be generated in response to a template or the like wherein the template may include a software module for providing instructions to a user interface for perform the bypass block navigation function.

The method is next configured for receiving 520, at a network interface a request for the webpage from the user interface. The request may be received at a user interface in response to a user input, or user device generated request. The method may then transmit 530, via the network interface, the webpage and a software module including an instruction associated with the bypass block navigation function in response to the request.

The method may then cause display 540, at the user interface, of the webpage at a starting location. In this example, the starting location may be the top of the page as webpages are typically displayed independent of the bypass block navigational function. The webpage may then be browsed conventionally using typical user inputs such as mouse functions, arrow keys and other navigational methods.

The method is next configured for receiving 550, from the user interface, a keystroke associated with the bypass block navigation function. In one example, the keystroke may be a "CTRL-F6" keypress or a "CMD-F6" keypress. In response to the received keystroke, the method may then cause display 560, at the user interface, the first portion of the webpage identified by a bypass block navigation attribute, such as "data-f6-region," in response to the instruction associated with the bypass block navigation function. Instructions for performing the bypass block navigation function maybe provided by the software module.

In an additional embodiment, the method may further be operative for receiving, from the user interface, a second keystroke associated with the bypass block navigation function. In this example, the second keystroke may be a second occurrence of the same keystroke received prior, such as "CTRL-F6." In response to the received second keystroke, the method may then be operative for causing display, at the user interface, of a second portion of the webpage different from the first portion, wherein the first portion and the second portion are both associated with the bypass block navigation attribute. For example, the method may receive a second instance of the keystroke associated with the bypass block navigation function via the user interface and cause causing display of a second portion of the webpage starting at a second point indicated by a second instance of the bypass block navigation attribute at the second portion of the webpage.

In an additional embodiment, the method may further be operative for receiving an alternate second keystroke associated with the bypass block navigation function. In response, the method may then cause display of a prior portion of the webpage different from the first portion, wherein the webpage further includes a prior instance of the bypass block navigation attribute at the prior portion of the webpage.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The various tasks performed in connection with the process may be performed by software, hardware, firmware, or any combination thereof. For illustrative purposes, the following description of process may refer to elements mentioned above. In practice, portions of process may be performed by different elements of the described system, e.g., component A, component B, or component C. It should be appreciated that process may include any number of additional or alternative tasks, the tasks shown need not be performed in the illustrated order, and process may be incorporated into a more comprehensive procedure or process having additional functionality not described in detail herein. Moreover, one or more of the tasks shown could be omitted from an embodiment of the process as long as the intended overall functionality remains intact.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of providing a bypass block navigation function to a user interface comprising:
   generating, by a processor at a web server in response to instructions from a web developer, a webpage including a bypass block navigation attribute positioned at a first location defined by the web developer within the webpage;
   receiving, at a network interface coupled to the processor, a request for the webpage from the user interface;
   determining if the bypass block navigation attribute is included in the webpage;
   transmitting, by the network interface coupled to the processor, the webpage including the bypass block navigation attribute positioned at the first location within the webpage and a software module including a first instructional code indicative of a predefined keystroke associated with the bypass block navigation function and a second instructional code defining an method for a reset of a display position of the webpage at the user interface from a current display location to the first location within the webpage in response to the request and the determination that the bypass block navigation attribute is included in the webpage;
   causing display, at the user interface located at a user platform, the webpage at a starting location; and
   causing display, at the user interface located at the user platform, of the first location within the webpage in response to receiving the predefined keystroke defined by the first instructional code from the user interface according to the method for the reset of the display position defined by the second instructional code.

2. The method of providing the bypass block navigation function to the user interface of claim 1, further comprising:
   receiving, from the user interface, a second keystroke associated with the bypass block navigation function; and
   causing display, at the user interface, of a second location within the webpage different from the first location, wherein the first location and the second location are both associated with the bypass block navigation attribute.

3. The method of providing the bypass block navigation function to the user interface of claim 1, further comprising:
   receiving a second instance of the predefined keystroke associated with the bypass block navigation function via the user interface; and
   causing display of a second location within the webpage different from the first location, wherein the webpage further includes a second instance of the bypass block navigation attribute at the second location within the webpage.

4. The method of providing the bypass block navigation function to the user interface of claim 1, wherein the webpage is generated by an imperative programming process and the bypass block navigation attribute is positioned by the web developer during the imperative programming process.

5. The method of providing the bypass block navigation function to the user interface of claim 1, wherein the webpage is generated by a declarative programming process and the bypass block navigation attribute is positioned before a heading on the webpage.

6. The method of providing the bypass block navigation function to the user interface of claim 1, wherein the bypass block navigation attribute is defined as a data-f6-region and wherein the predefined keystroke is related to the bypass block navigation attribute in the software module.

7. The method of providing the bypass block navigation function to the user interface of claim 1, wherein the webpage is generated in response to a template and wherein the template includes the software module.

8. The method of providing the bypass block navigation function to the user interface of claim 1, further comprising:
   receiving an alternate second keystroke associated with the bypass block navigation function; and
   causing display of a prior location within the webpage different from the first location, wherein the webpage further includes a prior instance of the bypass block navigation attribute at the prior location of the webpage.

9. An apparatus for providing a user interface comprising:
   a processor at a web server to generate, in response to instructions from a web developer, a webpage including a bypass block navigation attribute positioned at a first location defined by the web developer within the webpage;
   a network interface, coupled to the processor, for receiving a request for the webpage from the user interface;
   the processor being further configured to determine if the bypass block navigation attribute is included in the webpage;

the network interface being further configured to transmit the webpage including the bypass block navigation attribute positioned at the first location within the webpage and a software module including an instruction code indicative of a predefined keystroke and a method for a reset of a display position of the webpage at the user interface from a current display location to the first location within the webpage in response to the request and the determination that the bypass block navigation attribute is included in the webpage; and the user interface, located at a user platform, causing display of the webpage at a starting location, for receiving the predefined keystroke from the user interface and causing display of the first location within the webpage in response to the predefined keystroke and the according to the method for the reset of the display position of the webpage defined by the instruction code.

10. The apparatus for providing the user interface of claim 9, wherein the user interface is further configured for receiving a second keystroke associated with the bypass block navigation function, and causing display of a second location within the webpage different from the first location, wherein the first location and the second location are both associated with the bypass block navigation attribute.

11. The apparatus for providing the user interface of claim 9, wherein the user interface is further configured for receiving a second instance of the predefined keystroke associated with the bypass block navigation function via the user interface and causing display of a second location within the webpage different from the first location, wherein the webpage further includes a second instance of the bypass block navigation attribute at the second location within the webpage.

12. The apparatus for providing the user interface of claim 9, wherein the webpage is generated by an imperative programming process and the bypass block navigation attribute is positioned by the web developer during the imperative programming process.

13. The apparatus for providing the user interface of claim 9, wherein the webpage is generated by a declarative programming process and the bypass block navigation attribute is positioned before a heading on the webpage.

14. The apparatus for providing the user interface of claim 9, wherein the bypass block navigation attribute is defined as a data-f6-region and wherein the predefined keystroke related to the bypass block navigation attribute is identified in the software module.

15. The apparatus for providing the user interface of claim 9, wherein the webpage is generated in response to a template and wherein the template includes the software module.

16. The apparatus for providing the user interface of claim 9, where the user interface is further configured for receiving an alternate second keystroke associated with the bypass block navigation function and causing display of a prior location of the webpage different from the first location, wherein the webpage further includes a prior instance of the bypass block navigation attribute at the prior location within the webpage.

17. The apparatus for providing the user interface of claim 9, wherein the user interface is coupled to a data network and hosts a web browser application.

18. The apparatus for providing the user interface of claim 9, wherein the user interface forms part of a user device.

19. A system for providing a bypass block navigation function comprising:

a processor at a web server for generating, in response to instructions from a web developer, a webpage including a bypass block navigation attribute positioned at a first location defined by the web developer within the webpage and a software module including an instructional code indicative of a predefined keystroke and a method for a reset of a display position of the webpage at a user interface from a current display position to the first location within the webpage, for receiving a request for the webpage from the user interface, for determining if the bypass block navigation attribute is included within the webpage, and for transmitting the webpage and the instructional code in response to the request and a determination of an inclusion of the bypass block navigation attribute within the webpage; and the user interface for causing display of, at a user platform, the webpage at a starting location, for receiving, from a user input, the predefined keystroke associated with the bypass block navigation function, and for causing display, at the user platform the first location within the webpage identified by the bypass block navigation attribute in response to the predefined keystroke and the method for the reset of the display position of the webpage.

20. The system for providing the bypass block navigation function of claim 19, wherein the user interface is further configured for receiving a second instance of the predefined keystroke associated with the bypass block navigation function via the user input and causing display of a second location within the webpage different from the first location, identified by a second instance of the bypass block navigation attribute at the second location within the webpage.

* * * * *